(12) United States Patent
Fujii et al.

(10) Patent No.: US 7,482,990 B2
(45) Date of Patent: Jan. 27, 2009

(54) RADAR DEVICE FOR A MOBILE BODY

(75) Inventors: Tetsuya Fujii, Aichi-ken (JP); Chiharu Totani, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/723,432

(22) Filed: Mar. 20, 2007

(65) Prior Publication Data

US 2007/0229391 A1    Oct. 4, 2007

(30) Foreign Application Priority Data

Mar. 30, 2006    (JP)    ............................. 2006-095659

(51) Int. Cl.
*H01Q 1/32* (2006.01)
(52) U.S. Cl. ...................... 343/713; 343/909
(58) Field of Classification Search ................ 343/713, 343/711, 712, 909
See application file for complete search history.

(56) References Cited

U.S. PATENT DOCUMENTS 6,822,612 B2 * 11/2004 Takimoto et al. ............ 343/713

2006/0092086 A1 * 5/2006 Franson et al. ............... 343/767

FOREIGN PATENT DOCUMENTS

JP    A-2003-202369    7/2003

* cited by examiner

*Primary Examiner*—Tho G Phan
(74) *Attorney, Agent, or Firm*—Posz Law Group, PLC

(57) ABSTRACT

A radar device for a mobile body, such as a vehicle, having a high degree of installation freedom. The radar device comprises a sensor body transmitting and receiving electromagnetic waves, and path changing means placed in an electromagnetic wave path through which the electromagnetic waves pass and changing the propagation direction of the electromagnetic waves by refraction and/or reflection. Even when the installation site of the sensor body is restricted by requirements on a mobile body on which this radar device is to be mounted, the sensor body can be installed at the restricted site by changing the propagation direction of electromagnetic waves appropriately, while maintaining the functions of the sensor body appropriately.

8 Claims, 2 Drawing Sheets

RADAR DEVICE FOR A MOBILE BODY

BACKGROUND OF THE INVENTION

1. Field of the Invention

The present invention relates to a radar device for a mobile body and particularly to a radar device for a mobile body having a sensor body which transmits and receives electromagnetic waves such as millimeter waves and microwaves. The radar device for a mobile body according to the present invention can be suitably used, for example, as a radar device mounted on a vehicle and using millimeter waves.

2. Description of the Related Art

On-vehicle radar devices include laser radar devices using laser light, and electromagnetic wave radar devices using electromagnetic waves such as millimeter waves and microwaves. Among them, the electromagnetic wave radar devices attract much attention these days, because the electromagnetic wave radar devices are less susceptible to rain, snow, fog and other environmental factors than the laser radar devices, and are contributable to antenna miniaturization owing to superior linearity and directivity of electromagnetic waves with short wavelengths such as millimeter waves.

The on-vehicle electromagnetic wave radar device is used with a main purpose of detecting an obstacle ahead of the vehicle or measuring a distance between a preceding vehicle and the vehicle by transmitting millimeter waves or the like and receiving the millimeter waves or the like which have impinged on and been reflected by an object. In order to perform its functions such as detecting a preceding vehicle, the on-vehicle radar device is installed around a center of a vehicle front and particularly in a space between a front grill and a radiator. (See Japanese Unexamined Patent Publication (KOKAI) No. 2003-202369, for instance.)

Depending on vehicles, however, the abovementioned space for installing an on-vehicle radar device is sometimes restricted by a front design, the sizes and shapes of structures such as a radiator placed under a hood, a vehicular shock absorbing structure and the like. Accordingly, the on-vehicle radar device sometimes cannot be installed at a functionally most suitable site.

SUMMARY OF THE INVENTION

The present invention has been conceived in view of the above circumstances. It is an object of the present invention to provide a radar device for a mobile body having a high degree of installation freedom which is capable of changing an installation site in accordance with requirements on such a mobile body as a vehicle, while maintaining its functions such as sensing.

The radar device for a mobile body according to the present invention, which attains the above object, comprises a sensor body transmitting and receiving electromagnetic waves; and path changing means placed in an electromagnetic wave path through which the electromagnetic waves pass and changing the propagation direction of the electromagnetic waves by refraction and/or reflection.

In this radar device, the propagation direction of the electromagnetic waves transmitted and received by the sensor body can be changed by the path changing means. Accordingly, even when the site for installing the sensor body is restricted by requirements on a mobile body such as a vehicle on which this radar device is to be mounted, the sensor body can be installed at the restricted site by changing the propagation direction of the electromagnetic waves appropriately, while maintaining functions of the sensor body appropriately.

Therefore, the present invention can provide a radar device for a mobile body having a high degree of installation freedom which is capable of changing an installation site in accordance with requirements on a mobile body such as a vehicle, while maintaining functions such as sensing.

The path changing means is not limited particularly, as long as it can change the propagation direction of the electromagnetic waves into a predetermined direction by refraction and/or reflection, upon being placed in the electromagnetic wave path. The path changing means can be a combination of a plurality of reflective mirrors, but preferably the path changing means is one or a plurality of dielectric prisms.

Namely, in a preferred mode of the radar device for a mobile body according to the present invention, the path changing means comprises one or a plurality of dielectric prisms.

Here, the dielectric prism is a device constituted by a polyhedron formed of a dielectric material which electromagnetic waves can pass through and capable of changing the propagation direction of electromagnetic waves into a predetermined direction by use of refraction and/or reflection. This dielectric prism include, for example, dielectric prisms within which electromagnetic waves are only refracted, and dielectric prisms within which electromagnetic waves are reflected once or a plurality of times.

The dielectric prism can be transparent or opaque as long as electromagnetic waves can pass through it.

It is preferable that the dielectric prism has a relative permittivity $\in_r$ of about 1.5 to 7. The velocity of electromagnetic waves passing through the dielectric prism is inversely proportional to the square root of a relative permittivity (corresponding to an optical refractive index). Accordingly, it is possible to geometrically design the direction and intensity of electromagnetic wave propagation to be bent by the dielectric prism.

The material of the dielectric prism can be resin, glass or the like, but resin is preferable because it is lightweight and easy to shape. It is to be noted that the material can be a composite material of resin and glass and that the dielectric prism can be a combination of a dielectric prism formed of resin and a dielectric prism formed of glass.

The dielectric prism can be integrally formed with a casing of the sensor body or a radome, and can be independently formed as a separate body from these components.

Moreover, in the radar device for a mobile body according to the present invention, the kind of electromagnetic waves transmitted and received by the sensor body is not limited particularly, as long as they can be refracted or reflected like light within the dielectric body. It is preferable to employ millimeter waves, which are high frequency waves, in the frequency band of 24.6 GHz to 76.5 GHz.

In a preferred mode, the radar device for a mobile body according to the present invention further comprises a radome placed at an opening portion formed on the mobile body, and the sensor body is placed on the mobile body at a different height position from that of the radome.

In this radar device, since the propagation direction of the electromagnetic waves transmitted by the sensor body is changed into a predetermined direction by the path changing means, the transmitted electromagnetic waves can exit the radome placed at the different height position from that of the sensor body and radiate, for instance, in a roughly horizontal direction. Besides, if the propagation direction of the received electromagnetic waves which have entered from a roughly horizontal direction or the like and have passed through the radome is changed into a predetermined direction by the path changing means, the received electromagnetic waves can be received by the sensor body placed at the different height position from that of the radome.

Here, the radome is a cover for an opening portion formed on the mobile body in order to transmit and receive electromagnetic waves, and is formed of a material which the electromagnetic waves transmitted and received by the sensor body can pass through.

When the radar device for a mobile body according to the present invention is mounted on a vehicle, for instance, the radome can be placed so as to cover an opening portion formed at a center of the width of a front grill or the like. In this case, the sensor body is placed at a different height position from that of the radome placed at the opening portion of the front grill, for instance, at a lower position than the radome.

In a preferred mode of the radar device for a mobile body according to the present invention, the mobile body is a vehicle, the opening portion is formed on a vehicle hood, and the sensor body is placed on the vehicle at a lower position than the radome placed at the opening portion formed on the vehicle hood.

In this radar device, the radome is placed at an opening portion formed on a vehicle hood, and the sensor body is placed on the vehicle at a lower position than the radome. Accordingly, since the propagation direction of the electromagnetic waves transmitted by the sensor body is changed into a predetermined direction by the path changing means, the transmitted electromagnetic waves can exit the radome placed at the opening portion of the vehicle hood, that is, at a higher position than the sensor body and radiate, for example, in a roughly horizontal direction. Besides, if the propagation direction of the received electromagnetic waves which have entered from a roughly horizontal direction or the like and have passed through the radome is changed into a predetermined direction by the path changing means, the received electromagnetic waves can be received by the sensor body placed at a lower position than the radome.

As mentioned above, in the radar device for a mobile body according to the present invention, the degree of freedom in installing the sensor body can be increased while maintaining its functions such as sensing. Hence, the incoming and outgoing height and direction of the electromagnetic waves transmitted and received by the sensor body can be changed regardless of the height position of the installation site of the sensor body.

BRIEF DESCRIPTION OF THE DRAWINGS

Other objects and features of the invention will be apparent from the following description with reference to the accompanying drawings, in which.

DETAILED DESCRIPTION OF THE PREFERRED EMBODIMENTS

Hereinafter, preferred embodiments of the present invention will be described in detail with reference to the drawings.

The First Preferred Embodiment

A radar device for a mobile body according to a first preferred embodiment is an on-vehicle millimeter wave radar device to which the present invention is applied.

Figure 1:
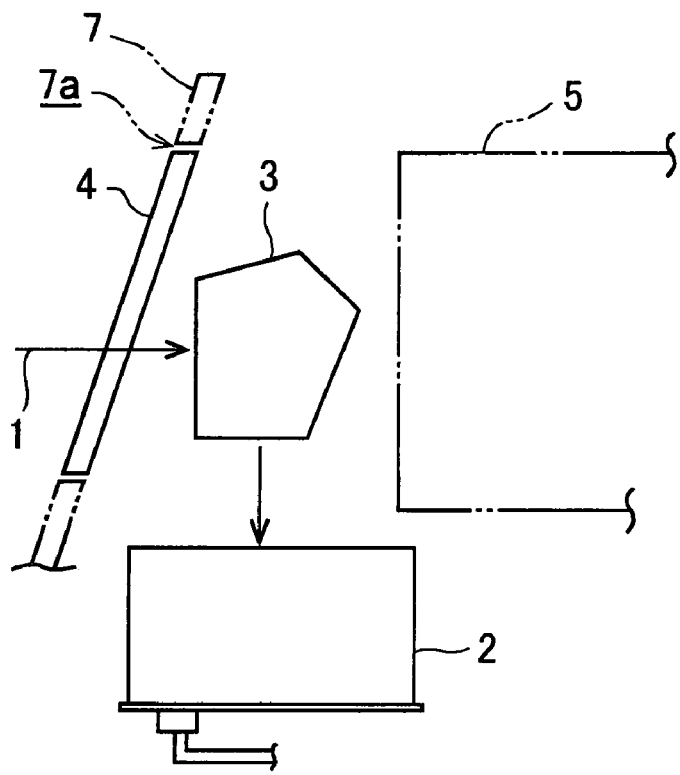
FIG. 1 is a schematic view of an entire construction of a radar device for a mobile body according to a first preferred embodiment of the present invention.
Figure 2:
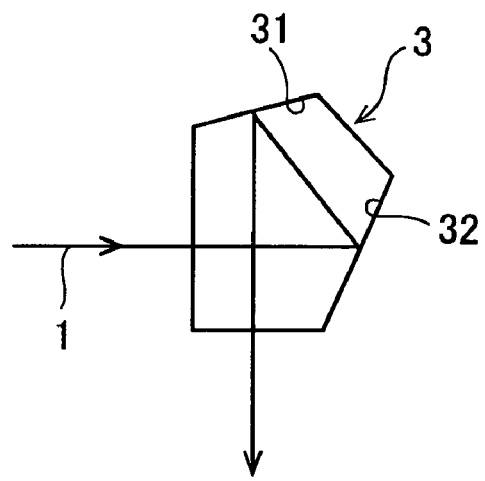
FIG. 2 is a side view of a dielectric prism according to the first preferred embodiment.

Referring to FIGS. 1 and 2, this radar device comprises a sensor body 2 having means (not shown) for transmitting and receiving millimeter waves 1 as electromagnetic waves, a dielectric prism 3 as path changing means placed in an electromagnetic wave (millimeter wave) path through which the electromagnetic waves (millimeter waves) 1 transmitted and received by the sensor body 2 pass, and a radome 4 placed so as to cover an opening portion 7a formed in a center of a front grill 7 of a vehicle (a center of the width of the vehicle).

The sensor body 2 is placed behind the front grill 7 and below a space between the front grill 7 and a radiator 5 in such a manner that a part of the sensor body 2 is overlapped with a lower part of the radiator 5. The sensor body 2 is fixed to a vehicle body (not shown) by fixing means (not shown). Namely, the sensor body 2 is placed at a different height position from that of the radome 4 placed at an opening portion 7a of the front grill 7, and more specifically at a lower position than the radome 4 by a predetermined height.

The dielectric prism 3 is placed behind the radome 4 and above the sensor body 2 and in the space between the radome 4 and the radiator 5. The dielectric prism 3 is fixed to the vehicle body (not shown) by fixing means (not shown).

Referred to FIG. 2, the dielectric prism 3 is formed by injecting molding polycarbonate having a relative permittivity $\in_r$ of 2.69 into a predetermined geometrically pentagonal prism shape, and has a first reflective surface 31 and a second reflective surface 32 which form a predetermined angle with each other. The dielectric prism 3 is a pentaprism capable of bending the propagation direction of the electromagnetic waves (millimeter waves) 1 at about a right angle by reflecting the electromagnetic waves (millimeter waves) 1 twice, i.e., by the first reflective surface 31 and the second reflective surface 32 within the dielectric prism 3.

The radome 4 is formed of a material through which electromagnetic waves (millimeter waves) 1 can pass, such as polycarbonate, polymethylmethacrylate, polypropylene and acrylic resin.

In the radar device of the first preferred embodiment having the above construction, the dielectric prism 3, which bends the propagation direction of the electromagnetic waves (millimeter waves) 1 at about a right angle by reflection, is placed in a path of the electromagnetic waves (millimeter waves) 1 transmitted and received by the sensor body 2 and behind the radome 4 and above the sensor body 2. Accordingly, the electromagnetic waves (millimeter waves) 1 transmitted upward by the sensor body 2 are incident from the underside of the dielectric prism 3 in a roughly vertical direction and reflected by the first reflective surface 31 and the second reflective surface 32 in this order, and then exit a front of the dielectric prism 3 in a roughly horizontal direction. Then the electromagnetic waves (millimeter waves) 1 pass through the radome 4 placed ahead of the dielectric prism 3 and radiate ahead of the vehicle in a roughly horizontal direction. The electromagnetic waves (millimeter waves) 1 reflected by a preceding vehicle or an obstacle lying ahead of the vehicle pass through the radome 4, are incident from the front of the dielectric prism 3 in a roughly horizontal direction and then reflected by the second reflective surface 32 and the first reflective surface 31 in this order, and exit from the underside of the dielectric prism 3 in a roughly vertical direction. Then the electromagnetic waves (millimeter waves) 1 are received by the sensor body 2 placed below the dielectric prism 3.

As mentioned above, in the radar device of this preferred embodiment, the propagation direction of the electromagnetic waves (millimeter waves) 1 transmitted and received by the sensor body 2 can be changed by the dielectric prism 3. Accordingly, even when the site for installing the sensor body 2 is restricted, for instance, to a position below the space between the radome 4 and the radiator 5, by requirements on a vehicle on which this radar device is to be mounted, the sensor body 2 can be installed at the restricted site, while maintaining functions of the sensor body 2 appropriately. Therefore, in this preferred embodiment, it is possible to provide a radar device for a mobile body having a high degree of installation freedom which is capable of changing an installation site in accordance with requirements on a vehicle, while maintaining functions such as sensing.

Moreover, in this preferred embodiment, since the path changing means is constituted by one dielectric prism 3, the construction can be simplified. Besides, since this dielectric prism 3 is formed of a synthetic resin, the dielectric prism 3 contributes to weight reduction and productivity improvement compared to a dielectric prism formed of glass.

Here, radar beam analysis in the sensor body 2 is often based on phase difference of the electromagnetic waves (millimeter waves) 1. If the path changing means includes reflection of the electromagnetic waves (millimeter waves) 1 and the number of reflection times of the electromagnetic waves (millimeter waves) 1 is odd, the phase difference of the electromagnetic waves (millimeter waves) 1 will be reversed. Then, radar beam analysis in the sensor body 2 will have to take the phase difference into consideration and carry out unnecessary analysis. Accordingly, when the path changing means for changing the propagation direction of the electromagnetic waves (millimeter waves) 1 includes an odd number of reflection times of the electromagnetic waves (millimeter waves) 1, there is a possibility that radar beam analysis in the sensor body 2 will be complicated.

In this respect, in this preferred embodiment, the propagation direction of the electromagnetic waves (millimeter waves) 1 is bent by reflecting the electromagnetic waves (millimeter waves) 1 twice within the dielectric prism 3. Accordingly, the radar beam analysis in the sensor body 2 will not be complicated.

It is to be noted that the above description does not intend that the present invention should exclude path changing means which includes an odd number of reflection times of the electromagnetic waves (millimeter waves) 1. A dielectric prism which includes an odd number of reflection times can be employed as path changing means without any inconveniences by employing a suitable process of radar beam analysis in the sensor body 2.

The Second Preferred Embodiment

Figure 3:
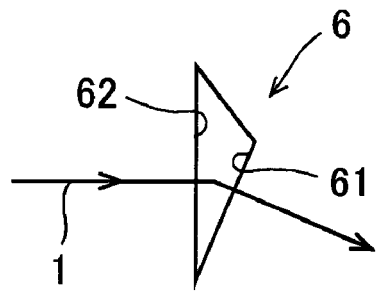
FIG. 3 is a side view of a dielectric prism according to a second preferred embodiment of the present invention.

A second preferred embodiment shown in FIG. 3 is a radar device in which the construction of the abovementioned path changing means is modified in the first preferred embodiment.

Namely, a dielectric prism 6 of this preferred embodiment as path changing means is formed by injecting molding polycarbonate having a relative permittivity $\in_r$ of 2.69 into a predetermined triangular prism shape, and has a first incident and exit surface 61 and a second incident and exit surface 62 which form a predetermined angle with each other. The dielectric prism 6 can bend the propagation direction of the electromagnetic waves (millimeter waves) 1 by about 5 to 30 degrees by refracting the electromagnetic waves (millimeter waves) 1 with a predetermined refractive index (a square root of the abovementioned relative permittivity $\in_r$) within the dielectric prism 6.

Since other constructions are basically the same as those of the first preferred embodiment, their description is omitted.

Therefore, the radar device of this preferred embodiment can also exhibit similar functions and advantages to those of the first preferred embodiment.

The Third Preferred Embodiment

Figure 4:
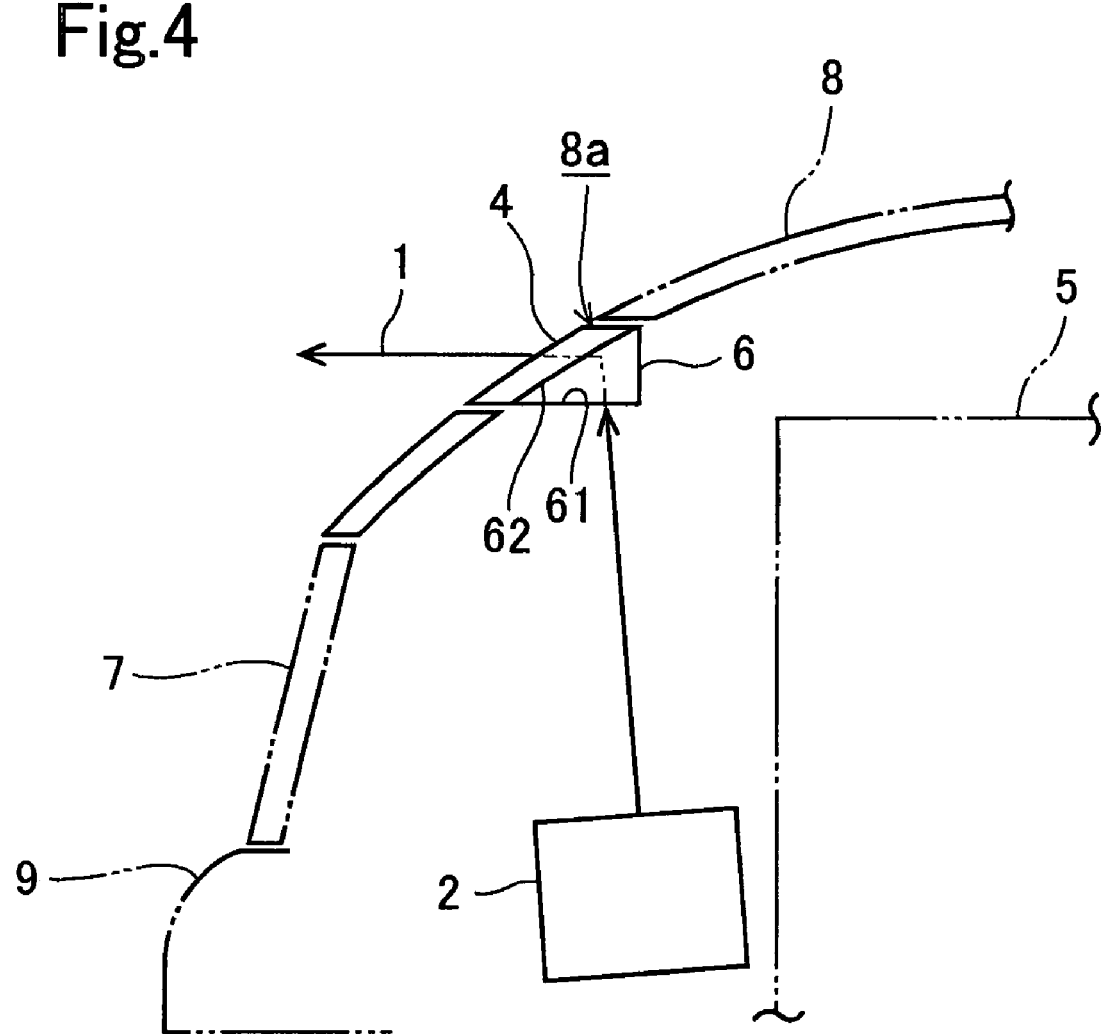
FIG. 4 is a schematic view of an entire construction of a radar device for a mobile body according to a third preferred embodiment of the present invention.

In a radar device of a third preferred embodiment shown in FIG. 4, the radome 4 is placed not on the front grill 7 but on a hood (bonnet) 8. Namely, an opening portion 8a is formed around a center of the width of the hood 8 and the radome 4 is placed so as to cover this opening portion 8a.

The dielectric prism 6 is integrally formed behind the radome 4. With respect to this dielectric prism 6, an angle formed by the first incident and exit surface 61 and the second incident and exit surface 62 and a relative permittivity $\in_r$ are determined so that the electromagnetic waves (millimeter waves) 1 transmitted by the sensor body 2 exit the radome 4 and radiate in a roughly horizontal direction by passing through the dielectric prism 6 and the radome 4.

The sensor body 2 is placed at a different height position from that of the radome 4 placed at the opening portion 8a of the hood 8, and more specifically at a lower position than the radome 4 and in an obliquely downward direction of the dielectric prism 6, that is, in a space between the radiator 5 and a bumper 9.

In this radar device of this preferred embodiment, since the propagation direction of the electromagnetic waves (millimeter waves) 1 transmitted by the sensor body 2 is changed by refraction within the dielectric prism 6, the transmitted electromagnetic waves (millimeter waves) 1 can exit the radome 4 placed at the opening portion 8a of the hood 8, which is placed at a higher position than that of the sensor body 2, and radiate in a roughly horizontal direction. Besides, if the propagation direction of the electromagnetic waves (millimeter waves) 1 which have entered from a roughly horizontal direction and have passed through the radome 4 is changed by refraction within the dielectric prism 6, the received electromagnetic waves (millimeter waves) 1 can be received by the sensor body 2 placed at a lower position than the radome 4.

Therefore, in the radar device of this preferred embodiment, even if there are some requirements on a vehicle which cannot allow the sensor body 2 to be placed above the radiator 5, for instance, in order to secure a space for deformation of the hood 8 below the hood 8, the electromagnetic waves (millimeter waves) 1 can exit the radome 4 placed at a higher position, that is, at the opening portion 8a of the hood 8 and radiate ahead of the vehicle in a roughly horizontal direction, while the sensor body 2 is placed at a lower position behind the bumper 9.

Since other constructions, functions and advantages of this preferred embodiment are basically the same as those of the first preferred embodiment, their description is omitted.

Other Preferred Embodiments

Obviously, many modifications and variations of the present invention are possible in the light of the above teachings. It is therefore to be understood that within the scope of the appended claims, the invention may be practiced otherwise than as specifically described.

For example, in the above description of the preferred embodiments, the dielectric prism has been provided as a separate body from the sensor body or the radome or as an integral body with the radome. However, the dielectric prism can also be provided integrally with a cover of the sensor body.

Moreover, in the above description of the preferred embodiments, the path changing means has been constituted by a single dielectric prism, but a combination of a plurality of dielectric prisms or a combination of a plurality of reflective mirrors can be employed as the path changing means. A combination of refraction within a dielectric prism and reflection within a dielectric prism can also be employed.

What is claimed is:

1. A radar device for a mobile body, comprising:
   a sensor body transmitting and receiving electromagnetic waves;
   path changing means placed in an electromagnetic wave path through which said electromagnetic waves pass and changing the propagation direction of said electromagnetic waves by refraction and/or reflection; and
   a radome placed at an opening portion formed on said mobile body, wherein
      said mobile body is a vehicle,
      said opening portion is formed on a vehicle hood,
      said sensor body is placed on said vehicle at a lower position than said radome placed at said opening portion formed on said vehicle hood, and
      said electromagnetic waves transmitted and received by said sensor body pass through said radome.

2. The radar device for a mobile body according to claim 1, wherein
   said sensor body is placed in a space between a radiator and a bumper.

3. The radar device for a mobile body according to claim 1, or claim 2, wherein
   said path changing means comprises one or a plurality of dielectric prisms.

4. The radar device for a mobile body according to claim 3, wherein
   said dielectric prism is integrally formed behind said radome.

5. A radar device for a mobile body, comprising:
   a sensor body transmitting and receiving electromagnetic waves;
   path changing means placed in an electromagnetic wave path through which said electromagnetic waves pass and changing the propagation direction of said electromagnetic waves by refraction and/ or reflection; and
   a radome placed at an opening portion formed on said mobile body, wherein
      said mobile body is a vehicle,
      said opening portion is formed on a front grill,
      said sensor body is placed on said vehicle at a lower position than said radome placed at said opening portion formed on said front grill, and
      said electromagnetic waves transmitted and received by said sensor body pass through said radome.

6. The radar device for a mobile body according to claim 5, wherein
   said sensor body is placed below a space between said front grill and a radiator.

7. The radar device for a mobile body according to claim 5 or 6, wherein
   said path changing means comprises one or a plurality of dielectric prisms.

8. The radar device for a mobile body according to claim 7, wherein
   said dielectric prism is a pentaprism having a first reflective surface and a second reflective surface which form a predetermined angle with each other.

* * * * *